(12) United States Patent
Tsuruya

(10) Patent No.: US 8,369,112 B2
(45) Date of Patent: Feb. 5, 2013

(54) MULTIPHASE RESONANT DC/DC CONVERTER

(75) Inventor: Mamoru Tsuruya, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 386 days.

(21) Appl. No.: 12/738,089

(22) PCT Filed: Dec. 9, 2008

(86) PCT No.: PCT/JP2008/072293
§ 371 (c)(1),
(2), (4) Date: Apr. 15, 2010

(87) PCT Pub. No.: WO2009/078305
PCT Pub. Date: Jun. 25, 2009

(65) Prior Publication Data
US 2010/0220505 A1    Sep. 2, 2010

(30) Foreign Application Priority Data
Dec. 18, 2007    (JP) .................................. 2007-325817

(51) Int. Cl.
*H02M 3/335*    (2006.01)
(52) U.S. Cl. ..................... 363/25; 363/21.03; 363/21.08
(58) Field of Classification Search ............ 363/15, 363/25, 21.08, 21.16, 21.03, 55, 56.02, 69, 363/44; 336/170, 220–222, 229
See application file for complete search history.

(56) References Cited

U.S. PATENT DOCUMENTS

| | | | | |
|---|---|---|---|---|
| 4,888,672 A | * | 12/1989 | Hiramatsu et al. ............... | 363/49 |
| 6,137,391 A | * | 10/2000 | Mitamura et al. ............. | 336/160 |
| 7,034,647 B2 | * | 4/2006 | Yan et al. ....................... | 336/212 |
| 7,035,125 B2 | * | 4/2006 | Yoshida ......................... | 363/71 |
| 7,046,532 B2 | * | 5/2006 | Matsuo et al. .................. | 363/65 |
| 7,116,561 B2 | * | 10/2006 | Osaka ........................ | 363/21.02 |
| 7,136,293 B2 | * | 11/2006 | Petkov et al. ................. | 363/126 |
| 7,643,314 B2 | * | 1/2010 | Sato ............................ | 363/21.02 |
| 2002/0122317 A1 | * | 9/2002 | Koshita et al. .................. | 363/16 |
| 2006/0208713 A1 | | 9/2006 | Tsuruya | |
| 2008/0298093 A1 | * | 12/2008 | Jin et al. ..................... | 363/21.06 |

FOREIGN PATENT DOCUMENTS

| | | |
|---|---|---|
| JP | 11 285249 | 10/1999 |
| JP | 2001 78449 | 3/2001 |
| JP | 2003 319650 | 11/2003 |
| JP | 2005 192285 | 7/2005 |
| JP | 2006 262601 | 9/2006 |

* cited by examiner

*Primary Examiner* — Adolf Berhane
*Assistant Examiner* — Emily Pham
(74) *Attorney, Agent, or Firm* — Oblon, Spivak, McClelland, Maier & Neustadt, L.L.P.

(57) ABSTRACT

A DC/DC converter has three half-bridge-type current resonant DC/DC converters that are connected in parallel, have a phase difference of 120 degrees, and are operated at a frequency higher than a resonant frequency. Each of the three half-bridge-type current resonant DC/DC converters includes a transformer having a primary winding, a secondary winding, and a tertiary winding, a series circuit connected to both ends of a DC power source and including first and second switching elements, a series circuit connected to both ends of the first or second switching element and including a resonant reactor, the primary winding of the transformer, and a resonant capacitor, and a rectifying circuit to rectify a voltage generated by the secondary winding and output the rectified voltage to a smoothing capacitor. The tertiary windings are annularly connected to a reactor.

3 Claims, 6 Drawing Sheets

MULTIPHASE RESONANT DC/DC CONVERTER

TECHNICAL FIELD

The present invention relates to a large-capacity DC/DC converter, and particularly, to a technique of achieving miniaturization and high efficiency.

BACKGROUND TECHNOLOGY

FIG. 1 is a circuit diagram of a related DC/DC converter (for example, Japanese Unexamined Patent Application Publication No. 2003-319650). The DC/DC converter illustrated in FIG. 1 is configured as a half-bridge-type current resonant DC/DC converter. Both ends of a DC power source Vdc1 are connected to a series circuit including a switching element Q1 of a MOSFET and a switching element Q2 of a MOSFET.

Between a drain and source of the switching element Q2, a diode D2 and a capacitor C2 are connected in parallel and a series circuit including a resonant reactor Lr, a primary winding $3a$ of a transformer T, and a resonant capacitor CR is connected. The resonant reactor LR is a leakage inductance between the primary and secondary sides of the transformer T and an exciting inductance is equivalently connected as a reactor LP to the primary winding $3a$. Between a drain and source of the switching element Q1, a diode D1 and a capacitor C1 are connected in parallel.

A first end of a secondary winding $3b$ of the transformer T is connected to an anode of a diode D3. A second end of the secondary winding $3b$ of the transformer T and a first end of a secondary winding $3c$ of the transformer T are connected to a first end of a smoothing capacitor CL. A second end of the secondary winding $3c$ of the transformer T is connected to an anode of a diode D4. A cathode of the diode D3 and a cathode of the diode D4 are connected to a second end of the capacitor CL. Both the ends of the capacitor CL are connected to a load RL.

A control circuit $10a$ alternately turns on/off the switching elements Q1 and Q2 according to an output voltage Vo from the capacitor CL, thereby conducting PFM control (frequency control) configured to make the output voltage of the capacitor CL constant.

Operation of the related DC/DC converter having such a configuration will be explained in detail with reference to a timing chart illustrated in FIG. 2.

In FIG. 2, Q1$v$ is a drain-source voltage of the switching element Q1, Q1$i$ is a drain current of the switching element Q1, Q2$i$ is a drain current of the switching element Q2, and Io is a rectified output current of the diodes D3 and D4.

From time t10 to t11, the switching element Q1 turns on and the current Q1$i$ passes clockwise through a path extending along Vdc1, Q1, LR, $3a$, CR, and Vdc1. Also, the current Io passes clockwise through a path extending along $3b$, D3, CL, and $3b$.

Regarding from time t11 to t12, the switching element Q1 turns off and the switching element Q2 turns on. Then, the current Q2$i$ passes counterclockwise through a path extending along CR, $3a$, LR, Q2, and CR and the current Io passes counterclockwise through a path extending along $3c$, D4, CL, and $3c$.

According to this half-bridge-type current resonant DC/DC converter, a withstand voltage of the switching elements Q1 and Q2 is the power source voltage Vdc1 and a withstand voltage of the diodes D3 and D4 is twice as large as the output voltage Vo. Therefore, low-voltage elements are usable. A zero-voltage switching operation takes place and a current passing through the primary winding $3a$ is substantially a sinusoidal wave, to realize a highly efficient compact DC/DC converter.

However, as illustrated in FIG. 2, the output current To involves large ripples to cause a problem that the capacitor CL must be enlarged if a large capacity is needed.

To solve the problem, a DC/DC converter illustrated in FIG. 3 may be considered. The DC/DC converter illustrated in FIG. 3 is constituted by connecting three half-bridge-type current resonant DC/DC converters $1a$ to $1c$ in parallel. Each of the half-bridge-type current resonant DC/DC converters $1a$ to $1c$ is configured nearly the same as the half-bridge-type current resonant DC/DC converter illustrated in FIG. 1 and commonly uses a DC power source Vdc1, a smoothing capacitor CL, and a load RL.

In the DC/DC converter illustrated in FIG. 3, a control circuit $10b$ individually operates the three half-bridge-type current resonant DC/DC converters $1a$ to $1c$ at a phase difference of 120 degrees, to realize large capacity and reduce ripples.

DISCLOSURE OF INVENTION

However, the current resonant DC/DC converter employing a system of operating switching elements Q1 to Q6 at a frequency equal to or higher than a resonant frequency of resonant circuits made by resonant capacitors CR1, CR2, and CR3 and resonant reactors LR1, LR2, and LR3 causes problems mentioned below if at least one of the resonant capacitors CR1, CR2, and CR3 and resonant reactors LR1, LR2, and LR3 of the converters $1a$ to $1c$ involves an unbalanced constant factor.

For example, if a value of the resonant reactor LR1 is 1.1 times a value of the resonant reactors LR2 and LR3, a resonant frequency fo1 by the resonant reactor LR1 becomes smaller as illustrated in FIG. 4 than resonant frequencies fo2 and fo3 by the resonant reactors LR2 and LR3.

Also, as illustrated in FIG. 4, if an operating frequency f equal to or higher than the resonant frequencies fo1, fo2, and fo3 is used to operate the converters $1a$ to $1c$, a resonant current Icr2 passing through the resonant capacitor CR2 and a resonant current Icr3 passing through the resonant capacitor CR3 becomes larger as illustrated in FIGS. 4 and 5 than a resonant current Icr1 passing through the resonant capacitor CR1. Namely, the resonant current Icr1 becomes unbalanced with respect to the resonant currents Icr2 and Icr3.

As a result, an output current Io passing through the capacitor CL increases ripples, and therefore, a balancing reactor must be inserted to adjust resonant frequencies to each other. Employing the complicated balancing reactor complicates the circuit.

MEANS TO SOLVE THE PROBLEMS

The present invention provides a large-capacity DC/DC converter capable of realizing compactness and high efficiency. For this, the below-mentioned means are adopted.

Namely, according to a first aspect of the present invention, the DC/DC converter has three half-bridge-type current resonant DC/DC converters that are connected in parallel, have a phase difference of 120 degrees, and are operated at a frequency higher than a resonant frequency. Each of the three half-bridge-type current resonant DC/DC converters includes a transformer having a primary winding, a secondary winding, and a tertiary winding, a first series circuit connected to both ends of a DC power source and including first and second switching elements, a second series circuit connected to both ends of the first or second switching element and including a resonant reactor, the primary winding of the transformer, and a resonant capacitor, and a rectifying circuit to rectify a voltage generated by the secondary winding of the transformer and output the rectified voltage to a smoothing capacitor. The tertiary windings and a reactor are annularly connected to each other.

According to a second aspect of the present invention, the DC/DC converter further includes a magnetic circuit having a core that defines magnetic paths and includes three or more legs, each of three legs of the three-or-more-leg core being wound with the corresponding primary and secondary windings.

According to a third aspect of the present invention, the DC/DC converter further includes a gap formed on a leg other than the three legs around which the primary and secondary windings are wound, a distance of the gap being adjusted to adjust an inductance of the reactor.

According to a fourth aspect of the present invention, the reactor of the DC/DC converter is a leakage inductance between the primary windings wound around the corresponding legs.

BEST MODE OF IMPLEMENTING INVENTION

Hereunder, DC/DC converters according to embodiments of the present invention will be explained in detail with reference to the drawings.

Embodiment 1

Figure 1:
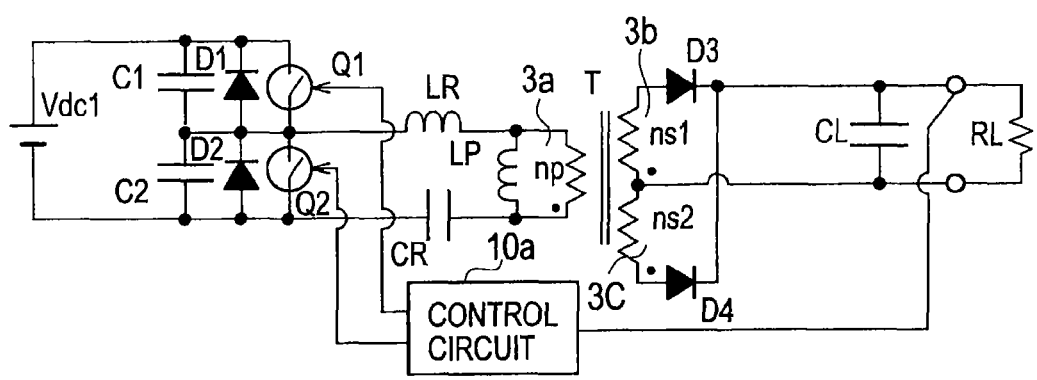
FIG. 1 is a circuit diagram of a related DC/DC converter.
Figure 2:
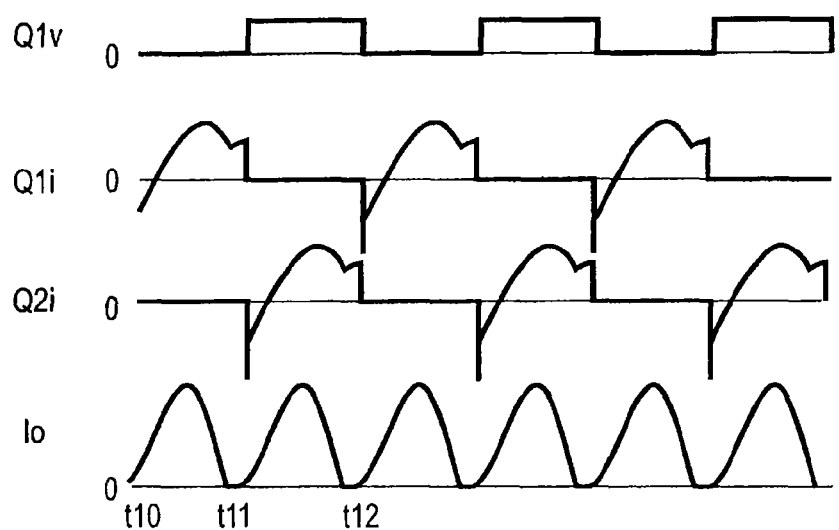
FIG. 2 is a timing chart of signals at various parts of the related DC/DC converter illustrated in FIG. 1.
Figure 3:
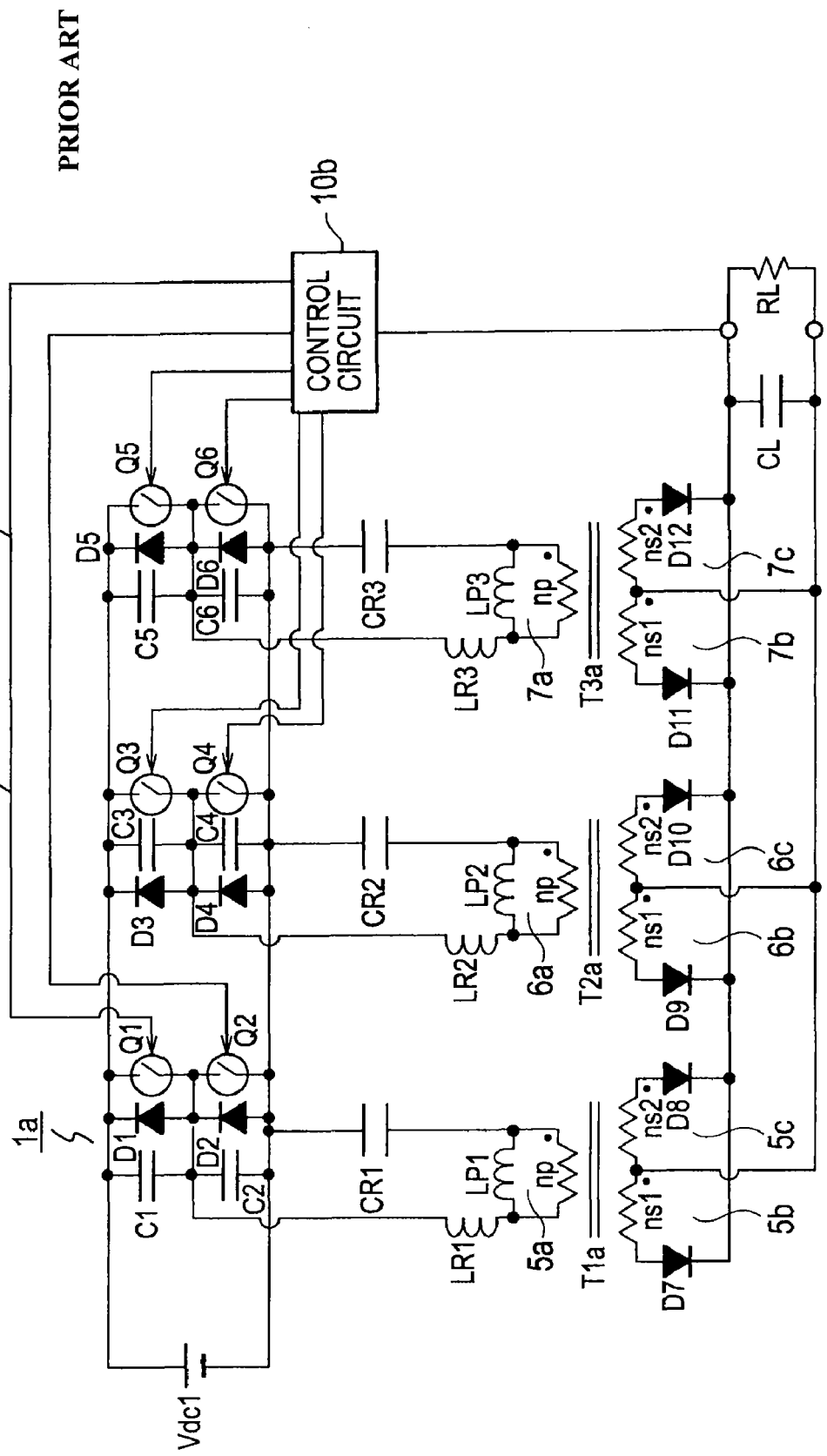
FIG. 3 is a circuit diagram of another related DC/DC converter.
Figure 4:
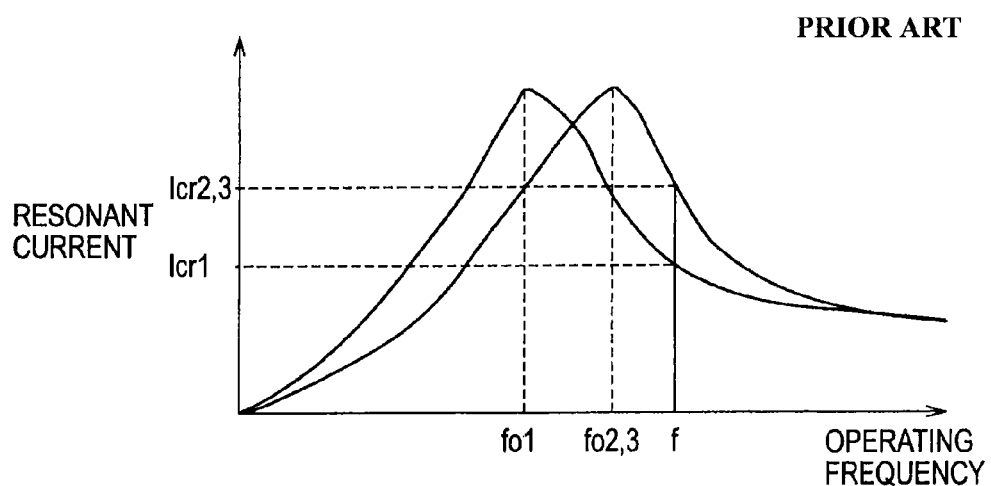
FIG. 4 is a view illustrating a relationship between operating frequency and resonant current of the related DC/DC converter illustrated in FIG. 3.
Figure 5:
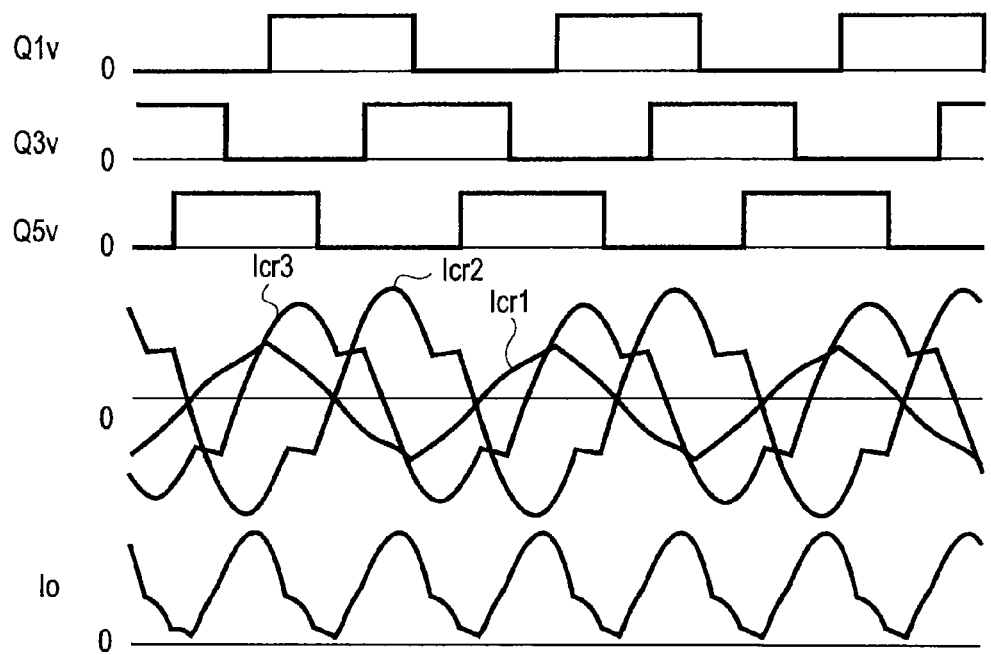
FIG. 5 is a timing chart of signals at various parts of the related DC/DC converter illustrated in FIG. 3.
Figure 6:
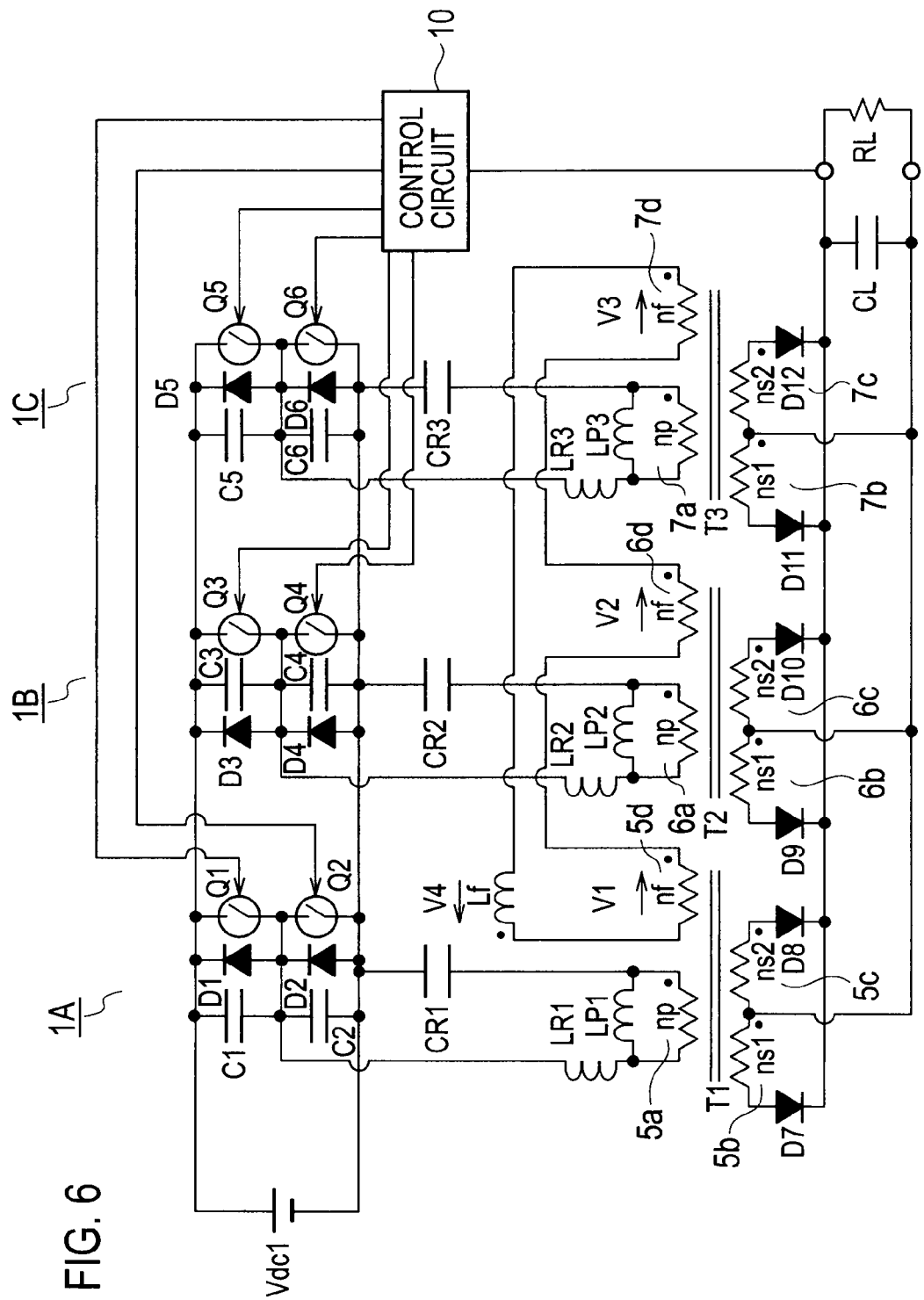
FIG. 6 is a circuit diagram of a DC/DC converter according to Embodiment 1.

FIG. 6 is a circuit diagram of a DC/DC converter according to Embodiment 1. The DC/DC converter illustrated in FIG. 6 is a DC/DC converter that connects in parallel three half-bridge-type current resonant DC/DC converters 1A to 1C operating at a frequency higher than a resonant frequency and operates them with a control circuit 10 by shifting phases of the current resonant DC/DC converters 1A to 1C by 120 degrees.

A transformer T1 has a primary winding 5a (the number of turns np), secondary windings 5b (the number of turns ns1) and 5c (the number of turns ns2), and a tertiary winding 5d (the number of turns nf). A transformer T2 has a primary winding 6a (the number of turns np), secondary windings 6b (the number of turns ns1) and 6c (the number of turns ns2), and a tertiary winding 6d (the number of turns nf). A transformer T3 has a primary winding 7a (the number of turns np), secondary windings 7b (the number of turns ns1) and 7c (the number of turns ns2), and a tertiary winding 7d (the number of turns nf).

In the current resonant DC/DC converter 1A, both ends of a DC power source Vdc1 are connected to a series circuit including a switching element Q1 of a MOSFET and a switching element Q2 of a MOSFET.

Between a drain and source of the switching element Q2, a diode D2 and a capacitor C2 are connected in parallel, and also, a series circuit including a resonant reactor LR1, the primary winding 5a of the transformer T1, and a resonant capacitor CR1 is connected. The resonant reactor LR1 is a leakage inductance between the primary and secondary sides of the transformer T1. The primary winding 5a is connected to an exciting inductance equivalently as a reactor LP1. Between a drain and source of the switching element Q1, a diode D1 and a capacitor C1 are connected in parallel.

A first end of the secondary winding 5b of the transformer T1 is connected to an anode of a diode D7. A second end of the secondary winding 5b of the transformer T1 and a first end of the secondary winding 5c of the transformer T1 are connected to a first end of a smoothing capacitor CL. A second end of the secondary winding 5c of the transformer T1 is connected to an anode of a diode D8. A cathode of the diode D7 and a cathode of the diode D8 are connected to a second end of the capacitor CL. Both the ends of the capacitor CL are connected to a load RL.

In the current resonant DC/DC converter 1B, both the ends of the DC power source Vdc1 are connected to a series circuit including a switching element Q3 of a MOSFET and a switching element Q4 of a MOSFET.

Between a drain and source of the switching element Q4, a diode D4 and a capacitor C4 are connected in parallel, and also, a series circuit including a resonant reactor LR2, the primary winding 6a of the transformer T2, and a resonant capacitor CR2 is connected. The resonant reactor LR2 is a leakage inductance between the primary and secondary sides of the transformer T2. The primary winding 6a is connected to an exciting inductance equivalently as a reactor LP2. Between a drain and source of the switching element Q3, a diode D3 and a capacitor C3 are connected in parallel.

A first end of the secondary winding 6b of the transformer T2 is connected to an anode of a diode D9. A second end of the secondary winding 6b of the transformer T2 and a first end of the secondary winding 6c of the transformer T2 are connected to the first end of the capacitor CL. A second end of the secondary winding 6c of the transformer T2 is connected to an anode of a diode D10. A cathode of the diode D9 and a cathode of the diode D10 are connected to the second end of the capacitor CL.

In the current resonant DC/DC converter 1C, both the ends of the DC power source Vdc1 are connected to a series circuit including a switching element Q5 of a MOSFET and a switching element Q6 of a MOSFET.

Between a drain and source of the switching element Q6, a diode D6 and a capacitor C6 are connected in parallel, and also, a series circuit including a resonant reactor LR3, the primary winding 7a of the transformer T3, and a resonant capacitor CR3 is connected. The resonant reactor LR3 is a leakage inductance between the primary and secondary sides of the transformer T3. The primary winding 7a is connected to an exciting inductance equivalently as a reactor LP3. Between a drain and source of the switching element Q5, a diode D5 and a capacitor C5 are connected in parallel.

A first end of the secondary winding 7b of the transformer T3 is connected to an anode of a diode D11. A second end of the secondary winding 7b of the transformer T3 and a first end of the secondary winding 7c of the transformer T3 are connected to the first end of the capacitor CL. A second end of the secondary winding 7c of the transformer T3 is connected to an anode of a diode D12. A cathode of the diode D11 and a cathode of the diode D12 are connected to the second end of the capacitor CL.

The tertiary winding 5d of the transformer T1, the tertiary winding 6d of the transformer T2, the tertiary winding 7d of the transformer T3, and a reactor Lf are connected in series and in a ring shape (a closed loop circuit).

A control circuit 10 uses an output voltage Vo from the capacitor CL, to alternately turn on/off the switching elements Q1 and Q2, alternately turn on/off the switching elements Q3 and Q4, alternately turn on/off the switching elements Q5 and Q6, and operate a first pair of the switching elements Q1 and Q2, a second pair of the switching elements Q3 and Q4, and a third pair of the switching elements Q5 and Q6 at a phase difference of 120 degrees between the pairs, thereby conducting PFM control (frequency control) to keep the output voltage Vo of the capacitor CL constant.

In the DC/DC converter of the present embodiment with such a configuration, the tertiary winding 5d of the transformer T1, the tertiary winding 6d of the transformer T2, the tertiary winding 7d of the transformer T3, and the reactor Lf are connected in a ring shape, and therefore, voltages V1, V2, and V3 induced by the tertiary windings 5d, 6d, and 7d, respectively, and a voltage V4 induced by the reactor Lf are expressed as V1+V2+V3+V4=0.

If the value of the reactor Lf is very small so that the voltage V4 is nearly equal to 0, then, V1+V2+V3 is nearly equal to 0.

Since the voltages V1, V2, and V3 each are an AC voltage, each voltage cyclically becomes zero. If the voltage V1 is 0, for example, the voltages V2 and V3 have the same absolute value and opposite polarities. Namely, the voltages V1, V2, and V3 must be voltages having different phases and the same value. Accordingly, the transformers T1, T2, and T3 induce a voltage of the same value, to provide a balanced output.

If the value of the reactor Lf is zero, the voltages V1, V2, and V3 generated by the tertiary windings 5d, 6d, and 7d involve harmonics and a relationship of V1+V2+V3=0 is not always established. At this time, an excessive current passes through the tertiary windings 5d, 6d, and 7d. The excessive current and harmonics can be suppressed by way of the impedance of the reactor Lf. Inserting the reactor Lf may cause a slight imbalance among the voltages of the transformers T1, T2, and T3. However, it can reduce a circulating current and loss. In practice, the value of the reactor Lf is adjusted to a best point between loss and balance.

Figure 7:
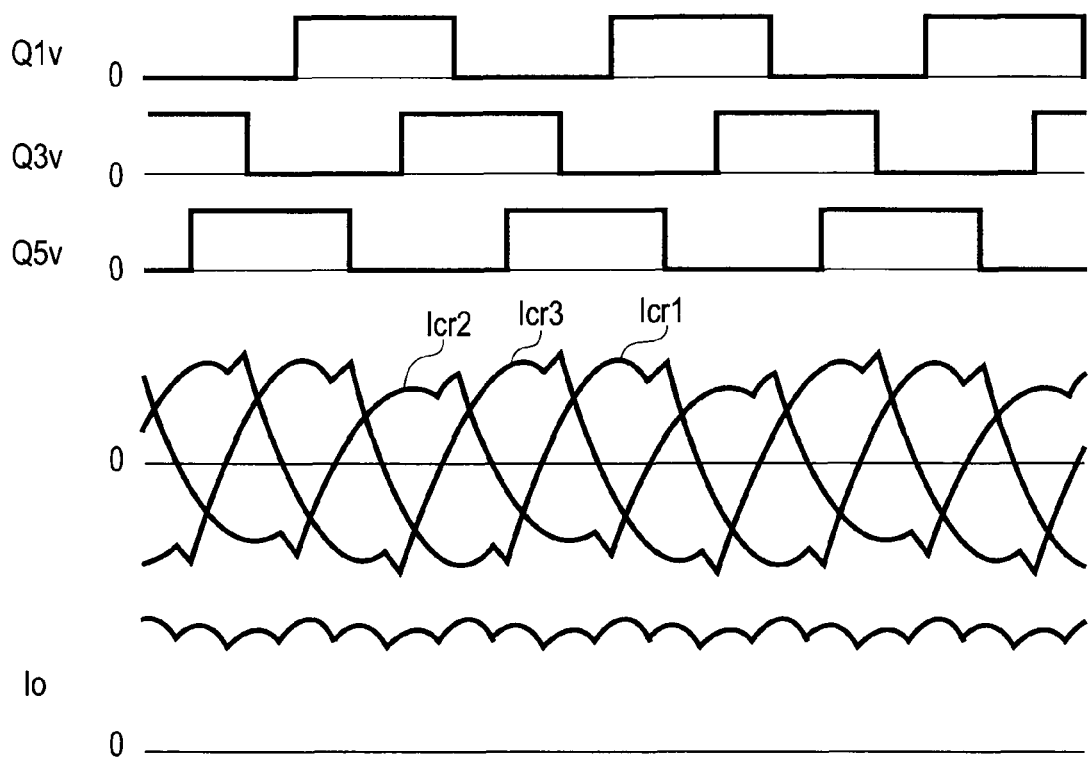
FIG. 7 is a timing chart of signals at various parts of the DC/DC converter according to Embodiment 1.

FIG. 7 is a timing chart of signals at various parts of the DC/DC converter of Embodiment 1. In FIG. 7, Q1v is a drain-source voltage of the switching element Q1, Q3v is a drain-source voltage of the switching element Q3, Q5v is a drain-source voltage of the switching element Q5, Icr1 is a resonant current passing through the resonant capacitor CR1, Icr2 is a resonant current passing through the resonant capacitor CR2, Ic3 is a resonant current passing to the resonant capacitor CR3, and Io is an output current rectified by the diodes D7 to D12.

In FIG. 7, the value of the resonant reactor LR1 is set as 1.1 times the value of the resonant reactors LR2 and LR3 when operating the circuit and obtaining the operating waveforms at the parts.

As is apparent from FIG. 7, the resonant currents Icr1, Icr2, and Icr3 substantially have the save value, and therefore, the output current Io is balanced with reduced ripples.

In this way the tertiary windings 5d, 6d, and 7d of the transformers T1, T2, and T3 and the reactor Lf are annularly connected to each other in order to correct voltages of the tertiary windings 5d, 6d, and 7d and balance the operation of the converters 1A to 1C. This reduces the size of an output filter and enables the use of diodes of low withstand voltage, thereby realizing a large-capacity DC/DC converter of small size and high efficiency.

Embodiment 2

Figure 8:
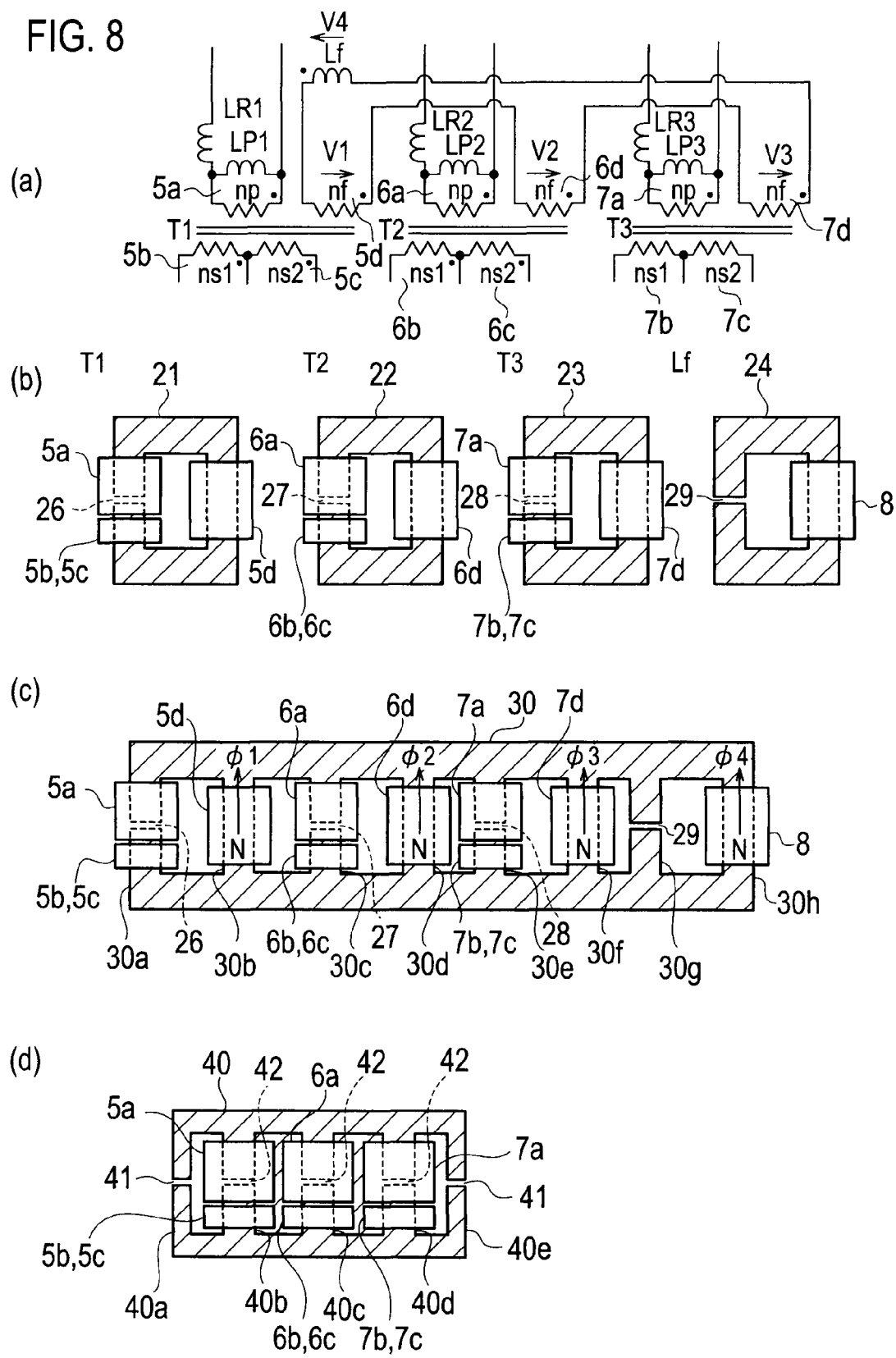
FIG. 8 is a view illustrating a magnetic circuit in which transformers and reactors of the DC/DC converter of Embodiment 1 are combined together.

FIG. 8 is a view illustrating a magnetic circuit that combines the transformers and reactors of the DC/DC converter of Embodiment 1. FIG. 8(a) illustrates a connection diagram of windings.

In a DC/DC converter of this embodiment, a transformer T1 has, as illustrated in FIG. 8(b), a core 21 made of a magnetic material on which a gap (a void) 26 is formed. A leg having the gap 26 is wound with a primary winding 5a and secondary windings 5b and 5c and the other leg of the core 21 is wound with a tertiary winding 5d, thereby constituting the transformer T1. The core 21 and gap 26 define a magnetic path.

A transformer T2 has a core 22 that defines a magnetic path and is made of a magnetic material. A leg having a gap 27 is wound with a primary winding 6a and secondary windings 6b and 6c and the other leg of the core 22 is wound with a tertiary winding 6d. A transformer T3 has a core 23 that defines a magnetic path and is made of a magnetic material. A leg having a gap 28 is wound with a primary winding 7a and secondary windings 7b and 7c and the other leg of the core 23 is wound with a tertiary winding 7d. A reactor Lf has a core 24 that defines a magnetic path and is made of a magnetic material. A leg of the core 24 has a gap 29 and the other leg thereof is wound with a winding 8.

The transformers T1, T2, and T3 and the reactor Lf are connected as illustrated in FIG. 8(c). Namely, the cores of the transformers T1, T2, and T3 and the reactor Lf illustrated in FIG. 8(a) are integrated into one as illustrated in FIG. 8(c), to form an equivalent magnetic circuit of the same operation.

The magnetic circuit illustrated in FIG. 8(c) includes a core 30 that defines magnetic paths and has a first leg 30a around which the primary winding 5a and secondary windings 5b and 5c of the transformer T1 are wound, a second leg 30b around which the tertiary winding 5d of the transformer T1 is wound, a third leg 30c around which the primary winding 6a and secondary windings 6b and 6c of the transformer T2 are wound, a fourth leg 30d around which the tertiary winding 6d of the transformer T2 is wound, a fifth leg 30e around which the primary winding 7a and secondary windings 7b and 7c of the transformer T3 are wound, a sixth leg 30f around which the tertiary winding 7d of the transformer T3 is wound, a seventh leg 30g on which a gap 29 is formed, and an eighth leg 30h around which the winding 8 is wound.

Magnetic flux Φ1 passes through the tertiary winding 5d of the transformer T1, magnetic flux Φ2 passes through the tertiary winding 6d of the transformer T2, magnetic flux Φ3 passes through the tertiary winding 7d of the transformer T3, and magnetic flux Φ4 passes through the winding 8 of the reactor Lf.

Here, the tertiary winding 5d of the transformer T1, the tertiary winding 6d of the transformer T2, the tertiary winding 7d of the transformer T3, and the reactor Lf are connected in a ring shape (closed loop shape), and therefore, the total of voltages generated by the windings 5d, 6d, and 7d and the reactor Lf is expressed by a relationship of V1+V2+V3+V4=0.

If the windings 5d, 6d, 7d, and 8 have the same number of turns N, the core around which the windings are wound has magnetic flux Φ expressed as $Nd\Phi_i/dt=V_i$ (i=1, 2, 3, 4). Since the total of voltages Vi of the windings is zero, the total of flux changes $d\Phi_i/dt$ of the core is zero. Accordingly, replacing the magnetic circuit illustrated in FIG. 8(*b*) with the magnetic circuit illustrated in FIG. 8(*c*) keeps the flux total of Φ1+Φ2+Φ3+Φ4=0. Namely, a distribution (magnetic path structure) of magnetic flux passing through the primary windings (5*a*, 6*a*, 7*a*) and secondary windings (5*b*, 5*c*, 6*b*, 6*c*, 7*b*, 7*c*) is unchanged, and therefore, operation is unchanged.

Since Φ1+Φ2+Φ3+Φ4=0, the leg 30*b* to the magnetic flux Φ1, the leg 30*d* to the magnetic flux Φ2, the leg 30*f* to the magnetic flux Φ3, and the leg 30*h* to the magnetic flux Φ4 can entirely be removed to form a magnetic circuit illustrated in FIG. 8(*d*) without changing operation because it has an equivalent magnetic path structure. The magnetic circuit illustrated in FIG. 8(*d*) has a core 40 that defines magnetic paths and has a leg 40*b* around which the primary winding 5*a* and secondary windings 5*b* and 5*c* of the transformer T1 are wound, a leg 40*c* around which the primary winding 6*a* and secondary windings 6*b* and 6*c* of the transformer T2 are wound, and a leg 40*d* around which the primary winding 7*a* and secondary windings 7*b* and 7*c* of the transformer T3 are wound. A gap 41 is formed on each of legs 40*a* and 40*e* and a gap 42 is formed on each of the legs 40*b*, 40*c*, and 40*d*. This realizes a compact equivalent magnetic circuit.

In this way, this embodiment employs a multiple-leg core having three or more legs, to simplify the three transformers T1, T2, and T3 and the reactor Lf and thereby simplify the circuit configuration.

The widths of the gaps of the legs around which the windings are wound may be adjusted to adjust reactors LP1, LP2, and LP3. Resonant reactors LR1, LR2, and LR3 are adjustable by adjusting positions (distances) between the primary windings 5*a*, 6*a*, and 7*a* and the secondary windings 5*b*, 5*c*, 6*b*, 6*c*, 7*b*, and 7*c*.

The width of the gap of the leg around which no winding is wound may be adjusted to adjust the reactor Lf. The reactor Lf may be a leakage inductance between the primary windings 5*a*, 6*a*, and 7*a* wound around the legs. This simplifies the core into a three-leg core.

Effect of Invention

According to the present invention, tertiary windings of transformers and a reactor are annularly connected to each other, to correct voltages of the tertiary windings and balance operation of converters. Accordingly, the present invention can provide a large-capacity DC/DC converter capable of realizing compactness and high efficiency.

A single core may be used to combine three transformers together and realize a compact structure.

UNITED STATES DESIGNATION

In connection with United States designation, this international patent application claims benefit of priority under 35 USC §119 to Japanese Patent Application No. 2007-325817 filed on Dec. 18, 2007, the entire contents of which are incorporated by reference herein.

The invention claimed is:

1. A multiphase resonant DC/DC converter comprising:
a plurality of half-bridge-type current resonant DC/DC converters connected in parallel and having a phase difference of 120 degrees, configured to operate at a frequency higher than a resonant frequency,
each of the plurality of half-bridge-type current resonant DC/DC converters comprising:
a transformer having a primary winding, a secondary winding, and a tertiary winding;
a first series circuit connected to both ends of a DC power source and including first and second switching elements;
a second series circuit connected to both ends of the first or second switching element and including a resonant reactor, the primary winding of the transformer, and a resonant capacitor; and
a rectifying circuit configured to rectify a voltage generated by the secondary winding of the transformer and output the rectified voltage to a smoothing capacitor, wherein
the tertiary windings are connected in series with each other, and a reactor is connected in parallel with the series circuit of the tertiary windings so that the tertiary windings and the reactor are annularly connected to each other.

2. The multiphase resonant DC/DC converter as set forth in claim 1, comprising a magnetic circuit having a core that defines magnetic paths and includes three or more legs, each of three legs of the three-or-more-leg core being wound with the corresponding primary and secondary windings.

3. The multiphase resonant DC/DC converter as set forth in claim 2, wherein
a gap is formed on a leg other than the three legs around which the primary and secondary windings are wound, and a distance of the gap is adjusted to adjust an inductance of the reactor.

\* \* \* \* \*